US012759256B2

(12) United States Patent
Millet et al.

(10) Patent No.: US 12,759,256 B2
(45) Date of Patent: Oct. 13, 2026

(54) TUBULAR INSERT FOR A SANDWICH PANEL, METHOD FOR PLACING SUCH A TUBULAR INSERT IN A THROUGH-ORIFICE OF A SANDWICH PANEL AND SANDWICH PANEL HAVING AT LEAST ONE SUCH TUBULAR INSERT

(71) Applicant: Airbus Operations SAS, Toulouse (FR)

(72) Inventors: Gérard Millet, Toulouse (FR); Vincent Delpy, Toulouse (FR); Simon Foucart-Gaudy, Toulouse (FR); Marc-Antoine Brocard, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 187 days.

(21) Appl. No.: 18/585,348

(22) Filed: Feb. 23, 2024

(65) Prior Publication Data

US 2024/0286374 A1 Aug. 29, 2024

(30) Foreign Application Priority Data

Feb. 27, 2023 (FR) ....................................... 2301753

(51) Int. Cl.
*B32B 3/08* (2006.01)
*B32B 3/12* (2006.01)
*B32B 3/26* (2006.01)

(52) U.S. Cl.
CPC .................. *B32B 3/08* (2013.01); *B32B 3/12* (2013.01); *B32B 3/266* (2013.01)

(58) Field of Classification Search
CPC .. B32B 3/08; B32B 3/12; B32B 3/266; B32B 3/06; B32B 7/08; B32B 33/00;
(Continued)

(56) References Cited

U.S. PATENT DOCUMENTS 4,428,705 A 1/1984 Gelhard
2005/0260060 A1 11/2005 Zoubek et al.
(Continued)

FOREIGN PATENT DOCUMENTS

DE 3042432 A1 5/1982
DE 102008024321 A1 11/2009
(Continued)

OTHER PUBLICATIONS

Espacenet translation of EP-2230409-A1 (Year: 2026).*
French Search Report for corresponding French Patent Application No. 2301753 dated Sep. 1, 2023.

*Primary Examiner* — Michael Zhang
(74) *Attorney, Agent, or Firm* — Greer, Burns & Crain, Ltd.

(57) ABSTRACT

A tubular insert designed to be positioned in a through-orifice of a sandwich panel. This tubular insert comprises a tubular body and at least one tab that has a first end connected to the tubular body and a second end at a distance from the first end, the tab being able to move between a deployed position in which the second end is moved away from the tubular body and a retracted position in which the second end is positioned at the tubular body, the latter having, for each tab, a cutout delimiting the tab and an opening when the tab is in the deployed position. Also a sandwich panel having at least one such insert and a method for placing such an insert.

14 Claims, 3 Drawing Sheets

(58) Field of Classification Search
CPC ........ F16B 21/02; F16B 21/08; F16B 13/141; F16B 5/01; F16B 13/0833
See application file for complete search history.

(56) References Cited

U.S. PATENT DOCUMENTS

| | | | | |
|---|---|---|---|---|
| 2009/0220320 | A1* | 9/2009 | Zhang | F16B 5/01 411/177 |
| 2017/0037886 | A1* | 2/2017 | Bradley | F16B 13/141 |

FOREIGN PATENT DOCUMENTS

| | | | | |
|---|---|---|---|---|
| EP | 2230409 | A1 * | 9/2010 | F16B 13/146 |
| JP | 6865530 | B2 | 4/2021 | |
| PL | 66430 | Y1 | 3/2013 | |

* cited by examiner

TUBULAR INSERT FOR A SANDWICH PANEL, METHOD FOR PLACING SUCH A TUBULAR INSERT IN A THROUGH-ORIFICE OF A SANDWICH PANEL AND SANDWICH PANEL HAVING AT LEAST ONE SUCH TUBULAR INSERT

CROSS-REFERENCES TO RELATED APPLICATIONS

This application claims the benefit of French Patent Application Number 2301753 filed on Feb. 27, 2023, the entire disclosure of which is incorporated herein by way of reference.

FIELD OF THE INVENTION

The present application relates to a tubular insert for a sandwich panel, to a method for placing such a tubular insert in a through-orifice of a sandwich panel and to a sandwich panel having at least one such tubular insert.

BACKGROUND OF THE INVENTION

As illustrated in FIG. 1, a sandwich panel 10 comprises first and second outer walls 12, 14 and at least one cellular structure 16 interposed between the first and second outer walls 12, 14. Each of the first and second outer walls 12, 14 comprises an inner face 12.1, 14.1 connected to the cellular structure 16 and an outer face 12.2, 14.2 opposite the inner face 12.1, 14.1.

According to an embodiment visible in FIG. 2, the sandwich panel 10 comprises a tubal insert 20 opening at the outer faces 12.2, 14.2 of the first and second outer walls 12, 14. The sandwich panel 10 comprises a through-orifice 22, penetrating the outer walls 12, 14 and the cellular structure 16, which is configured to house the tubular insert 20.

This tubular insert 20 comprises a first part 24 inserted into the through-orifice 22 from the outer face 12.2 of the first outer wall 12 and a second part 26 inserted into the through-orifice 22 from the outer face 14.2 of the second outer wall 14. The first part 24 comprises a first tubular portion 24.1 and a first flange 24.2 provided at one end of the first tubular portion 24.1 and configured to be pressed against the outer face 12.2 of the first outer wall 12. The second part 26 comprises a second tubular portion 26.1 and a second flange 26.2 provided at one end of the second tubular portion 26.1 and configured to be pressed against the outer face 14.2 of the second outer wall 14. The first and second tubular portions 24.1, 26.1 are configured to fit one into the other.

According to an operating mode known from the prior art, a method for placing a tubular insert 20 comprises a step of making a through-orifice 22, a step of hollowing out the cellular structure 16, between the first and second outer walls 12, 14, so as to create an annular housing 28 around the through-orifice 22, a step of filling the annular housing 28 with a mastic (or an adhesive) 30 and coating the surfaces of the sandwich panel 10 in contact with the first and second parts 24, 26 of the tubular insert 20 with mastic 30, a step of successively putting in place the first and second parts 24, 26 of the tubular insert 20 and finally a step of removing the mastic 30 inside the tubular portions 24.1, 26.1 of the tubular insert 20.

This method for placing a tubular insert 20 is not satisfactory because it is relatively lengthy to implement. In addition, this method creates shapes that protrude with respect to the outer faces 12.2, 14.2 of the outer walls 12, 14 at each end of the tubular insert 20. Finally, the height of these protruding shapes is difficult to control, since the thickness of the mastic between the flanges 24.2, 26.2 and the outer walls 12, 14 is itself difficult to control.

The present invention aims to remedy all or some of the drawbacks of the prior art.

SUMMARY OF THE INVENTION

To this end, the invention relates to a tubular insert comprising a tubular body that has an axis of revolution, inner and outer cylindrical faces that are coaxial with each other and with the axis of revolution, and first and second annular terminal faces connecting the inner and outer cylindrical faces.

According to the invention, the tubular insert comprises at least one tab that has a first end connected to the tubular body and a second end at a distance from the first end, the first and second ends being substantially parallel to the axis of revolution of the tubular body, said tab being able to move between a deployed position in which the second end is moved away from the tubular body and a retracted position in which the second end is positioned at the tubular body. In addition, the tubular body comprises, for each tab, a cutout delimiting the tab and an opening when the corresponding tab is in the deployed position.

Unlike the prior art, which provides flanges on the outside of the sandwich panel so as to immobilize the tubular insert with respect to the sandwich panel in a longitudinal direction (perpendicular to the outer walls), the invention provides at least one tab positioned between the outer walls of the sandwich panel when the tubular insert is positioned in the through-orifice of the sandwich panel so as to immobilize the tubular insert with respect to the sandwich panel in the longitudinal direction. Thus, the tubular insert may comprise no part that protrudes with respect to the outer walls of the sandwich panel. In addition, the tubular insert can be made in a single part, and this reduces its placement time.

According to another feature, the tubular insert comprises a plurality of tabs distributed around the tubular body.

According to another feature, at least each tab is made of an elastic material, the deployed position of the tab corresponding to a rest position, the retracted position corresponding to an elastic deformation of the tab.

According to another feature, the tubular body comprises at least one opening that makes it possible to make the inner and outer cylindrical faces of the tubular body communicate.

According to another feature, at least one of the first and second terminal faces comprises at least one indentation configured to make the tubular insert pivot on itself.

According to another feature, the tubular insert has a sleeve with a solid wall, which is fitted into the tubular body.

The invention also relates to a sandwich panel comprising first and second outer walls, at least one cellular structure interposed between the first and second outer walls and at least one tubular insert according to one of the preceding features, positioned in a through-orifice of the sandwich panel.

According to another feature, the through-orifice comprises first and second segments at the first and second outer walls. In addition, the tubular insert has a transverse section greater than that of the first and second segments of the through-orifice when each tab is in the deployed position and a transverse section smaller than the section of the first and second segments of the through-orifice when each tab is in the retracted position.

According to another feature, the tubular body has an outer diameter substantially equal to the segments of the through-orifice.

According to another feature, the tubular body has a height substantially equal to the thickness of the sandwich panel.

According to another feature, each tab comprises upper and lower edges that are substantially parallel to each other, connecting the first and second ends, the upper and lower edges being spaced apart by a distance substantially equal to the thickness of the cellular structure.

According to another feature, the upper edge of each tab is separated from the first terminal face by a distance substantially equal to the thickness of the first outer wall. In addition, the lower edge is separated from the second terminal face by a distance substantially equal to the thickness of the second outer wall.

The invention also relates to a method for placing a tubular insert in a through-orifice of a sandwich panel having first and second outer walls and at least one cellular structure interposed between the first and second outer walls. This placement method comprises a step of inserting the tubular insert into the through-orifice, each tab being in the retracted position, until each tab is positioned between the first and second outer walls and returns to the deployed position, a step of pivoting the tubular insert on itself so as to create, around the tubular body of the tubular insert, an annular housing between the first and second outer walls and a step of injecting a mastic into the annular housing so as to secure the tubular insert and the sandwich panel.

BRIEF DESCRIPTION OF THE DRAWINGS

Further features and advantages will become apparent from the following description of the invention, which description is given solely by way of example, with reference to the appended drawings, in which.

DETAILED DESCRIPTION OF THE PREFERRED EMBODIMENTS

Figure 1:
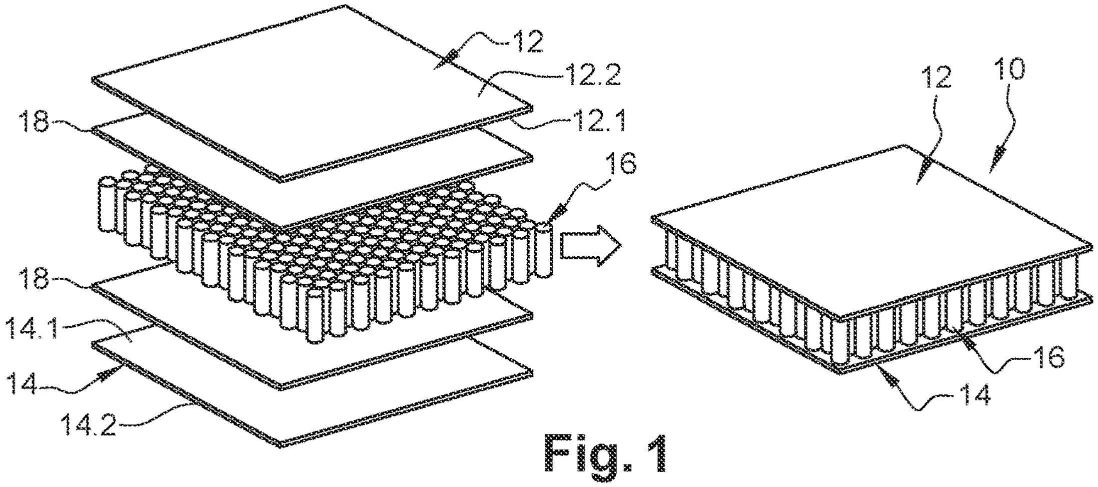
FIG. 1 is a perspective view of a sandwich panel comprising a cellular structure interposed between two outer walls, illustrating one embodiment.
Figure 2:
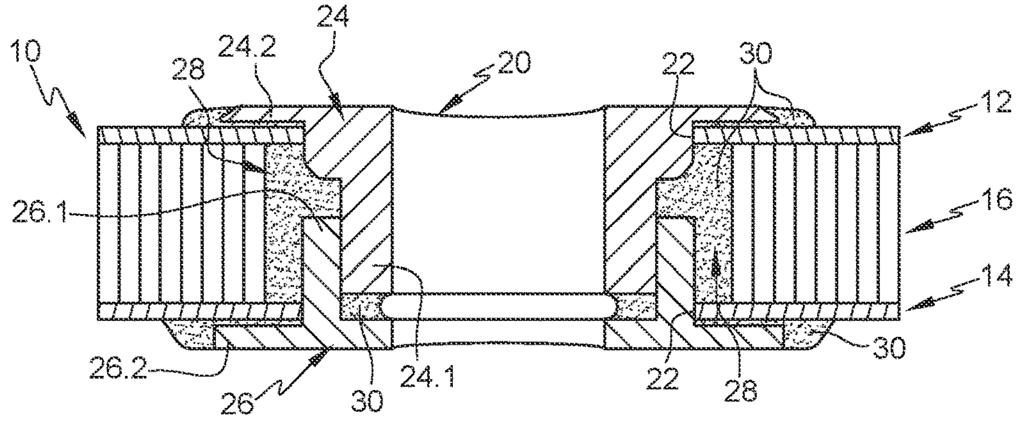
Fig. 2 (prior art)
FIG. 2 is a transverse cross section of a sandwich panel having a tubular insert, illustrating one embodiment of the prior art.
Figure 3:
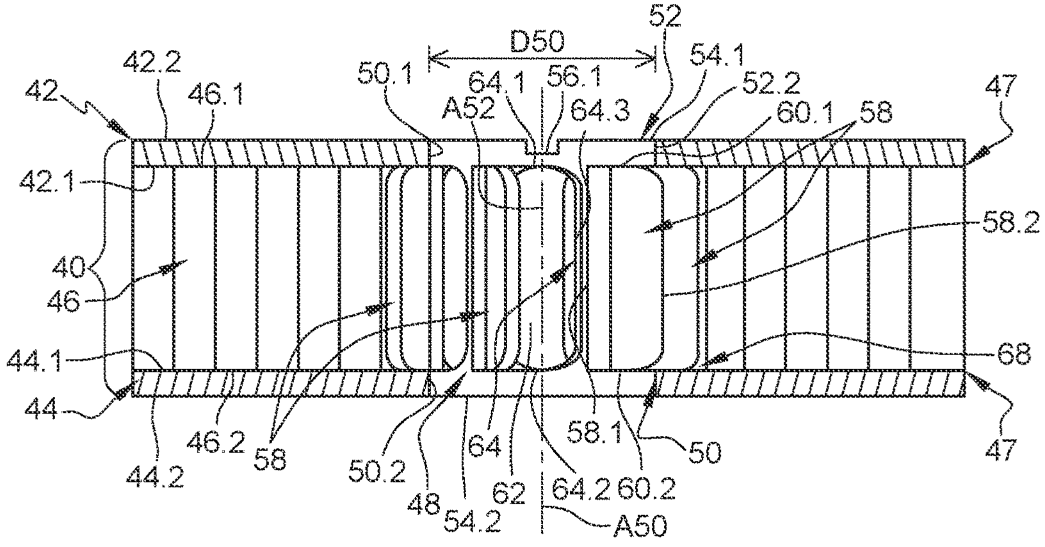
FIG. 3 is a transverse cross section of a sandwich panel having a tubular insert, illustrating one embodiment of the invention.

According to an embodiment in FIG. 3, a sandwich panel 40 comprises first and second outer walls 42, 44 and at least one cellular structure 46 interposed between the first and second outer walls 42, 44. Each of the first and second outer walls 42, 44 comprises an inner face 42.1, 44.1 connected to the cellular structure 46 and an outer face 42.2, 44.2 opposite the inner face 42.1, 44.1. Each of the first and second outer walls 42, 44 has a thickness that corresponds to the distance separating the inner and outer faces 42.1, 44.1, 42.2, 44.2 of the first or second outer wall 42, 44. The cellular structure 46 comprises a first face 46.1 connected to the inner face 42.1 of the first outer wall 42 and a second face 46.2 connected to the inner face 44.1 of the second outer wall 44. The cellular structure 46 has a thickness corresponding to the distance separating the first and second faces 46.1, 46.2. The sandwich panel 40 has a thickness corresponding to the distance separating the outer faces 42.2, 44.2 of the outer walls 42, 44.

According to one configuration, an adhesive film 47 is interposed between each of the first and second outer walls 42, 44 and the cellular structure 46 so as to ensure the connection between the inner face 42.1, 44.1 of each outer wall 42, 44 and the cellular structure 46.

The sandwich panel 40 is not described further since it is known from the prior art.

This sandwich panel 40 comprises at least one tubular insert 48 positioned in a through-orifice 50 opening at the outer faces 42.2, 44.2 of the first and second outer walls 42, 44. The through-orifice A50 has an axis A50 substantially perpendicular to the outer walls 42, 44 and a diameter D50. By "substantially" it is meant that the value is within 10%. It comprises first and second segments 50.1, 50.2 at the first and second outer walls 42, 44 that have diameters identical to the diameter D50 of the through-orifice 50.

Figure 4:
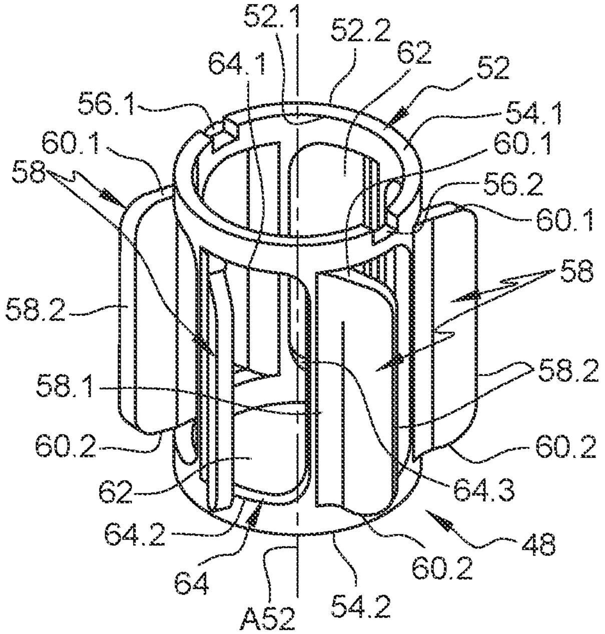
FIG. 4 is a perspective view of a tubular insert, illustrating one embodiment of the invention.
Figure 5:
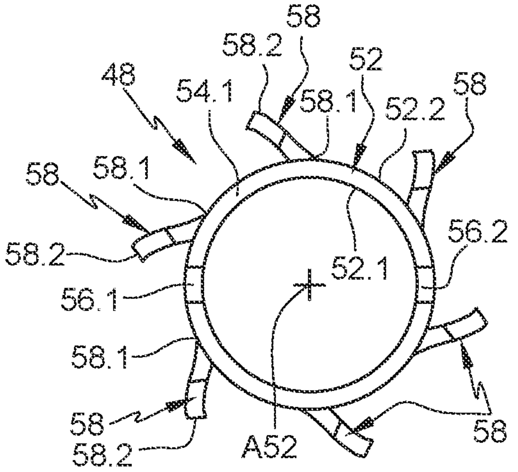
FIG. 5 is a top view of the tubular insert visible in FIG. 4.

As illustrated in FIGS. 4 and 5, this tubular insert 48 comprises a tubular body 52 that has an inner cylindrical face 52.1, an outer cylindrical face 52.2 and first and second terminal faces 54.1, 54.2. The inner and outer cylindrical faces 52.1, 52.2 are coaxial with each other and with an axis of revolution A52. The tubular body 52 of the tubular insert 48 has a thickness, corresponding to the distance separating the inner and outer cylindrical faces 52.1, 52.2, of between 1 and a few millimeters.

The first and second terminal faces 54.1, 54.2 are annular and connect the inner and outer cylindrical faces 52.1, 52.2. They are substantially parallel to each other and substantially perpendicular to the axis of revolution A52 of the tubular body 52 of the tubular insert 48. The tubular body 52 has a height, corresponding to the distance separating the first and second terminal faces 54.1, 54.2, which is substantially equal to the thickness of the sandwich panel 40. Thus, when the tubular insert 48 is positioned in the through-orifice 50, the first and second terminal faces 54.1, 54.2 are respectively flush with the outer faces 42.2, 44.2 of the first and second outer walls 42, 44. Unlike in the prior art, once put in place, the tubular insert 48 according to the invention does not comprise any part that protrudes with respect to the outer faces 42.2, 44.2 of the sandwich panel 40.

According to one configuration, at least one of the first and second terminal faces 54.1, 54.2 comprises at least one indentation configured to make the tubular insert 48 pivot on itself, about the axis of revolution A52, with a tool. To this end, at least one of the first and second terminal faces 54.1, 54.2 comprises at least one pair of radial slots 56.1, 56.2 that are diametrically opposite one another. According to various configurations, a plurality of pairs of radial slots 56.1, 56.2 may be provided on the same first or second terminal face 54.1, 54.2 and/or at least one pair of radial slots 56.1, 56.2 is provided on each of the first and second terminal faces 54.1, 54.2.

According to one feature of the invention, the tubular insert 48 comprises at least one tab 58 that has a first end 58.1 connected to the tubular body 52, more particularly to the outer cylindrical face 52.2, and a second end 58.2 at a distance from the first end 58.1, said tab 58 being able to move between a deployed position (visible in FIGS. 4 and 5) in which the second end 58.2 is moved away from the tubular body 52 and a retracted position in which the second end 58.2 is positioned at the tubular body 52. In the deployed position, the tubular insert 48 has a transverse section (perpendicular to the axis of revolution A52) greater than that of the first and second segments 50.1, 50.2 of the through-orifice 50, preventing the tubular insert 48 from coming out of the through-orifice 50. In the retracted position, the tubular insert 48 has a reduced transverse section, smaller than the section of the first and second segments 50.1, 50.2 of the through-orifice 50, allowing it to be inserted into the through-orifice 50.

According to one configuration, at least each tab 58 is made of an elastic material, the deployed position of the tab 58 corresponding to a rest position in which the tab 58 is not subjected to any stress, the retracted position corresponding to an elastic deformation of the tab 58 in the presence of a stress tending to push the second end 58.2 of the tab 58 in the direction of the outer cylindrical face 52.2 of the tubular insert 48.

According to one embodiment, the tubular body 52 and the tab(s) 58 are made of metal and are made in one piece.

According to one arrangement, each tab 58 is configured to be able to cut into the cellular structure 46 when the tubular insert 48, which is inserted into the through-orifice 50, pivots on itself. In the deployed position, each tab 58 forms, with a tangent to the outer cylindrical face 52.2 passing through the first end 58.1 of the tab 58, an angle of between 20 and 70°. According to one configuration, the second end 58.2 of each tab 58 may be tapered.

According to one embodiment, the tubular insert 48 comprises a plurality of tabs 58 regularly distributed around the tubular body 52. According to an arrangement visible in FIGS. 4 and 5, the tubular insert 48 comprises six tabs.

Each tab 58 comprises upper and lower edges 60.1, 60.2 that are substantially parallel to each other, connecting the first and second ends 58.1, 58.2. The upper edge 60.1 is closest to the first terminal wall 54.1, the lower edge 60.2 being closest to the second terminal wall 54.2. The first and second ends 58.1, 58.2 are substantially parallel to the axis of revolution A52 of the tubular body 52 of the tubular insert 48. The upper and lower edges are substantially perpendicular to the axis of revolution A52 of the tubular body 52 of the tubular insert 48. Thus, each tab 58 has a substantially rectangular shape, the first and second ends 58.1, 58.2 corresponding to the long sides of the rectangle, the upper and lower edges 60.1, 60.2 corresponding to the short sides of the rectangle.

According to one configuration, the upper and lower edges 60.1, 60.2 are spaced apart by a distance substantially equal to that separating the inner faces 42.1, 44.1 of the outer walls 42, 44 or to the thickness of the cellular structure 46. Thus, the tubular insert 48 is immobilized in translation in a direction parallel to the axis A50 of the through-orifice 50 when the tubular insert 48 is positioned in the through-orifice 50.

According to a preferred embodiment, the upper edge 60.1 is separated from the first terminal face 54.1 by a distance substantially equal to the thickness of the first outer wall 42. Thus, the first terminal face 54.1 of the tubular insert 48 is flush with the outer face 42.2 of the first outer wall 42 when the tubular insert 48 is positioned in the through-orifice 50. The lower edge 60.2 is separated from the second terminal face 54.2 by a distance substantially equal to the thickness of the second outer wall 44. Thus, the second terminal face 54.2 of the tubular insert 48 is flush with the outer face 44.2 of the second outer wall 44 when the tubular insert 48 is positioned in the through-orifice 50.

According to one configuration, the tubular body 52 comprises at least one opening 62 that makes it possible to make the inner and outer cylindrical faces 52.1, 52.2 of the tubular body 52 communicate.

According to one embodiment, the tubular body 52 comprises, for each tab 58, a cutout 64 delimiting the tab 58. This cutout 64 comprises upper and lower segments 64.1, 64.2 that correspond to the upper and lower edges 60.1, 60.2 of the tab 58 and a longitudinal segment 64.3, connecting the first and second segments 64.1, 64.2, which corresponds to the second end 58.2 of the tab 58. Each cutout 64 delimits an opening 62 when the corresponding tab 58 is in the deployed position. The fact that each tab 58 is obtained from a cutout 64 of the tubular body 52 allows each tab 58 to be positioned in the opening 62 delimited by the cutout 64 in the retracted position. Thus, the tabs 58 do not form overthicknesses with respect to the outer cylindrical face 52.2 of the tubular body 52 in the retracted position. In this case, the tubular body 52 has an outer diameter substantially equal to those of the segments 50.1, 50.2 of the through-orifice 50. Thus, the tubular insert 48 is immobilized in a transverse plane (perpendicular to the axis A50 of the through-orifice 50) with respect to the sandwich panel 40 when the tubular insert 48 is positioned in the through-orifice 50.

Figure 8:
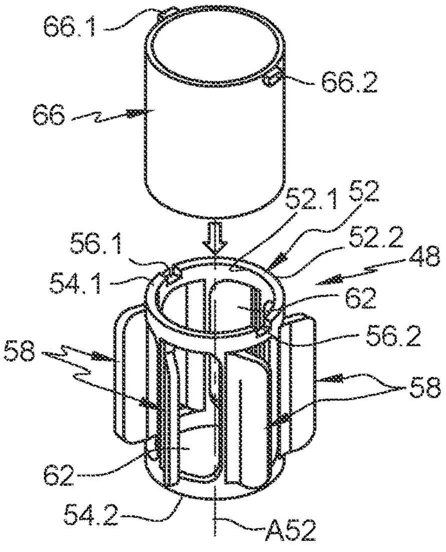

According to a configuration visible in FIG. 8, the tubular insert 48 has a sleeve 66 positioned in the tubular body 52. This sleeve 66 has a solid wall (without openings), an outer diameter substantially identical to the diameter of the inner cylindrical face 52.1 of the tubular body 52 and a height substantially identical to that of the tubular body 52. According to one operating mode, the sleeve 66 is fitted into the tubular body 52. In order to immobilize it in translation and in rotation with respect to the tubular body 52, the sleeve 66 comprises at one of its ends, protruding with respect to its outer surface, at least one lug 66.1 configured to be housed in one of the radial slots 56.1, 56.2 provided at one of the first and second terminal faces 54.1, 54.2 of the tubular body 52. According to one arrangement, the sleeve 66 comprises two lugs 66.1, 66.2 that are diametrically opposite one another, configured to be housed in the radial slots 56.1, 56.2 that are diametrically opposite one another and provided at one of the first and second terminal faces 54.1, 54.2 of the tubular body 52.

Figure 6:
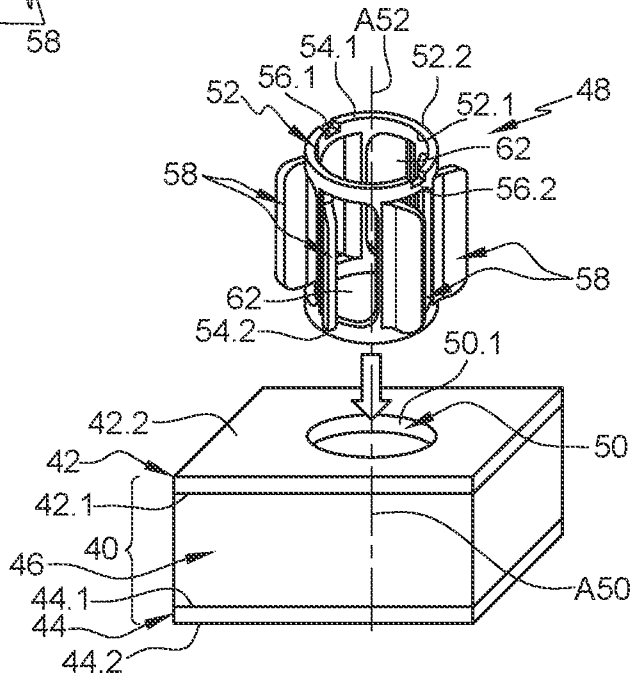
FIG. 6 is a perspective view of the tubular insert visible in FIG. 4 prior to its insertion into a through-orifice of a sandwich panel, illustrating one embodiment of the invention, FIG. 7A schematically shows a step of a method for placing a tubular insert in a sandwich panel, illustrating one embodiment of the invention, FIG. 7B schematically shows another step of a method for placing a tubular insert in a sandwich panel, illustrating one embodiment of the invention, FIG. 7C schematically shows a further step of a method for placing a tubular insert in a sandwich panel, illustrating one embodiment of the invention, FIG. 7D schematically shows another step of a method for placing a tubular insert in a sandwich panel, illustrating one embodiment of the invention, and, FIG. 8 is a perspective view of a tubular insert, illustrating another embodiment of the invention.

According to one operating mode, prior to the putting in place of the tubular insert 48, a through-orifice 50 is made in the sandwich panel 40, as illustrated in FIG. 6. In some cases, the through-orifice 50 is obtained by widening an existing hole.

A method for placing a tubular insert 48 comprises a step of inserting the tubular insert 48 into the through-orifice 50, the tabs 58 being in the retracted position, until the tabs 58 are positioned between the first and second outer walls 42, 44 and automatically return to the deployed position by virtue of the elastic properties of the tubular insert 48.

Figure 7A:
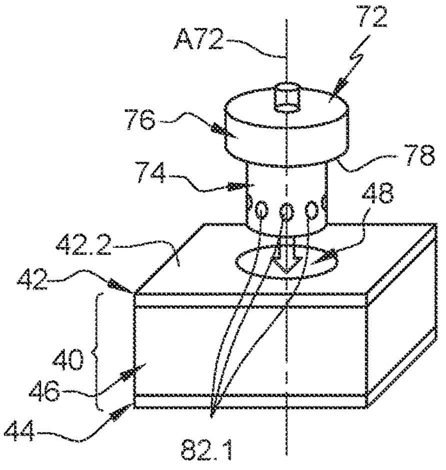
Figure 7B:
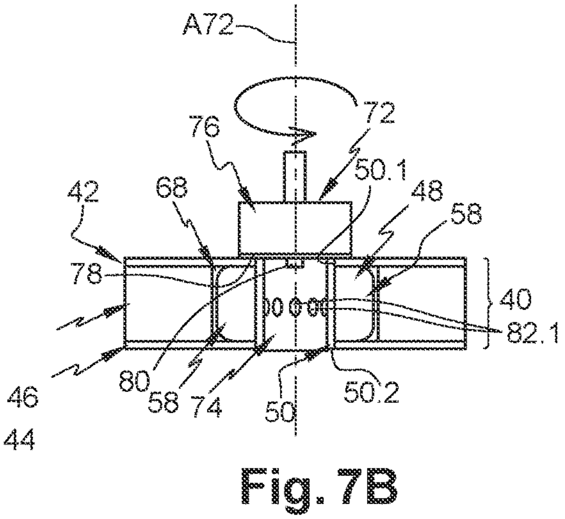

Next, as illustrated in of FIG. 7B, the placement method comprises a step of pivoting the tubular insert 48 on itself about the axis of revolution A52. During this step, the tabs 58 cut into the cellular structure 46 so as to create, around the tubular body 52 of the tubular insert 48, an annular housing 68 between the first and second outer walls 42, 44.

Figure 7C:
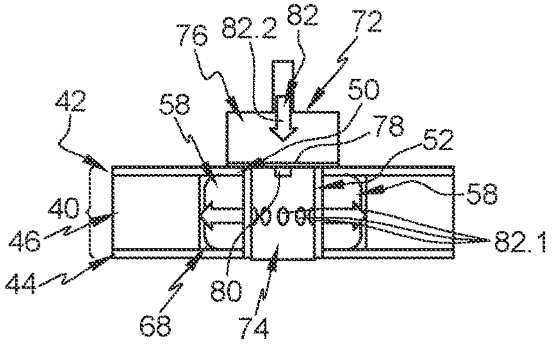
Figure 7D:
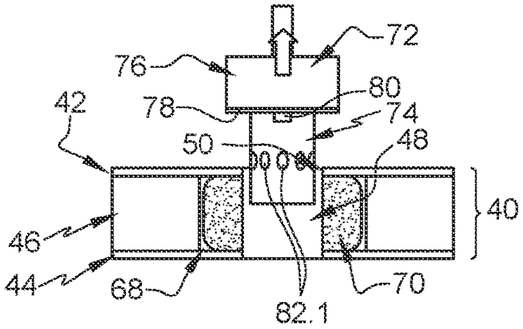

Next, as illustrated in FIG. 7C, the placement method comprises a step of injecting a mastic (or an adhesive) 70 into the annular housing 68 via the openings 62 of the tubular body 52. Mastic 70 is understood to mean any product that makes it possible to secure the tubular insert 48 and the sandwich panel 40.

Finally, as illustrated in FIG. 8, the placement method comprises a step of inserting the sleeve 66 into the tubular body 52.

As illustrated in FIGS. 7A to 7D, one and the same tool 72 is used for the steps of pivoting and of injecting the mastic 70. This tool 72 comprises a cylindrical body 74, which has a diameter substantially equal to the inner diameter of the tubular body 52 of the tubular insert 48, and a cylindrical head 76, which is coaxial with the cylindrical body 74 and as one with the latter, which has a diameter greater than that of the cylindrical body 74. The cylindrical body 74 and the head 76 have the same axis of revolution A72.

The tool 72 has a shoulder 78 connecting the cylindrical body 74 and the head 76, which is substantially perpendicular to the axis of revolution A72.

The cylindrical body 74 of the tool 72 is configured to fit into the tubular body 52 of the tubular insert 48. This cylindrical body 74 has a height substantially equal to that of the tubular body 52.

When the cylindrical body 74 is inserted into the tubular body 52, the shoulder 78 is pressed against one of the first and second terminal faces 54.1, 54.2 of the tubular body 52, in this case the one provided with the radial slots 56.1, 56.2.

The tool 72 comprises, at the shoulder 78, lugs 80 configured to be housed in the radial slots 56.1, 56.2 of the tubular insert 48. Thus, when the lugs 80 of the tool 72 are inserted into the radial slots 56.1, 56.2 of the tubular insert 48, the pivoting of the tool 72 causes the pivoting of the tubular insert 48.

The tool 72 comprises a pivoting system or can be connected to tooling incorporating a pivoting system, such as a rotary portable tool, so as to allow it to pivot on itself about its axis of revolution A72.

The tool 72 comprises a mastic supply system 82 having lateral orifices 82.1 situated at the lateral face of the cylindrical body 74 of the tool 72 and at least one supply duct 82.2 connected to each lateral orifice 82.2. In operation, when the cylindrical body 74 is positioned in the tubular body 52 of the tubular insert 48, the lateral orifices 82.1 are positioned in line with the openings 62 and communicate with the annular housing 68 via said openings 62. The tool 72 may comprise a mastic injection system or be connected to a mastic injection system configured to push the mastic 70 from the supply duct 82.2 towards the lateral orifices 82.1.

Of course, the invention is not limited to this tool 72 for the pivoting of the tubular insert 48 and the injection of the mastic 80.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tubular insert comprising:

a tubular body that has an axis of revolution, inner and outer cylindrical faces that are coaxial with each other and with the axis of revolution, and first and second annular terminal faces connecting the inner and outer cylindrical faces, at least one tab that has a first end connected to the tubular body and a second end at a distance from the first end, the first and second ends being substantially parallel to the axis of revolution of the tubular body, the at least one tab configured to move between a deployed position in which the second end is moved away from the tubular body and a retracted position in which the second end is positioned at the tubular body, wherein the tubular body comprises, for each tab, a cutout delimiting the tab and an opening when the corresponding tab is in the deployed position, wherein, in the deployed position, each of the at least one tab forms an angle with a tangent to the outer cylindrical face passing through the first end of the at least one tab.

2. The tubular insert according to claim 1, wherein the angle of between 2° and 70°.

3. The tubular insert according to claim 1, wherein the tubular insert comprises a plurality of tabs distributed around the tubular body.

4. The tubular insert according to claim 1, wherein each tab is made of an elastic material, wherein the deployed position of the tab corresponds to a rest position, the retracted position corresponding to an elastic deformation of the tab.

5. The tubular insert according to claim 1, wherein at least one of the first and second terminal faces comprises at least one indentation configured to make the tubular insert pivot on itself.

6. The tubular insert according to claim 1, wherein the tubular insert has a sleeve with a solid wall, which is fitted into the tubular body.

7. A sandwich panel comprising:

first and second outer walls, at least one cellular structure interposed between the first and second outer walls, and the tubular insert according to claim 1 positioned in a through-orifice of the sandwich panel.

8. The sandwich panel according to claim 7, wherein the through-orifice comprises first and second segments at the first and second outer walls, and wherein the tubular insert has a transverse section greater than that of the first and second segments of the through-orifice when each tab is in the deployed position and a transverse section smaller than the section of the first and second segments of the through-orifice when each tab is in the retracted position.

9. The sandwich panel according to claim 8, wherein the tubular body has an outer diameter substantially equal to an inner diameter of the first and second segments of the through-orifice.

10. The sandwich panel according to claim 7, wherein the sandwich panel comprises a thickness, and wherein the tubular body has a height substantially equal to the thickness of the sandwich panel.

11. The sandwich panel according to claim 7, wherein the cellular structure has a thickness, and wherein each tab comprises upper and lower edges that are substantially parallel to each other, connecting the first and second ends, the upper and lower edges being spaced apart by a distance substantially equal to the thickness of the cellular structure.

12. The sandwich panel according to claim 11, wherein the first and second outer walls respectively have first and second thicknesses, wherein the upper edge of each tab is separated from the first terminal face by a distance substantially equal to the first thickness of the first outer wall, and wherein the lower edge is separated from the second terminal face by a distance substantially equal to the second thickness of the second outer wall.

13. A sandwich panel comprising:

first and second outer walls, at least one cellular structure interposed between the first and second outer walls, and a tubular insert positioned in a through-orifice of the sandwich panel, the tubular insert comprising:

a tubular body that has an axis of revolution, inner and outer cylindrical faces that are coaxial with each other and with the axis of revolution, and first and second annular terminal faces connecting the inner and outer cylindrical faces, at least one tab that has a first end connected to the tubular body and a second end at a distance from the first end, the first and second ends being substantially parallel to the axis of revolution of the tubular body, the at least one tab configured to move between a deployed position in which the second end is moved away from the tubular body and a retracted position in which the second end is positioned at the tubular body, wherein the tubular body comprises, for each tab, a cutout delimiting the tab and an opening when the corresponding tab is in the deployed position, wherein the at least one cellular structure has a thickness, and wherein each tab comprises upper and lower edges that are substantially parallel to each other, connecting the first and second ends, the upper and lower edges being spaced apart by a distance substantially equal to the thickness of the at least one cellular structure.

14. A method for placing the tubular insert according to claim 1 in a through-orifice of a sandwich panel having first and second outer walls and at least one cellular structure interposed between the first and second outer walls, the method comprising:

inserting the tubular insert into the through-orifice, each tab being in the retracted position, until each tab is positioned between the first and second outer walls and returns to the deployed position, pivoting the tubular insert on itself so as to create, around the tubular body of the tubular insert, an annular housing between the first and second outer walls, injecting a mastic into the annular housing so as to secure the tubular insert and the sandwich panel.

* * * * *